United States Patent
Noyer et al.

(10) Patent No.: US 10,085,372 B2
(45) Date of Patent: Oct. 2, 2018

(54) TRACTION MACHINE AND EQUIPMENT COMBINATION WITH DRIVER ASSISTANCE SYSTEM

(71) Applicant: CLAAS Selbstfahrende Erntemaschinen GmbH, Harsewinkel (DE)

(72) Inventors: Pierre Noyer, Vélizy (FR); Ralf Bölling, Steinhagen (DE); Tim Lütke Harmann, Sendenhorst (DE); Mathieu Köhler, Harsewinkel (DE); Julien Wachter, Metz (FR); Burkhard Sagemüller, Gütersloh (DE)

(73) Assignee: CLAAS Selbstfahrende Ernemaschinen GmbH, Harsewinkel (DE)

( * ) Notice: Subject to any disclaimer, the term of this patent is extended or adjusted under 35 U.S.C. 154(b) by 0 days.

(21) Appl. No.: 15/590,550

(22) Filed: May 9, 2017

(65) Prior Publication Data

US 2017/0325395 A1    Nov. 16, 2017

(30) Foreign Application Priority Data

May 10, 2016   (DE) .................. 10 2016 108 590
Sep. 27, 2016   (DE) .................. 10 2016 118 203

(51) Int. Cl.
*A01B 69/04*   (2006.01)
*B60R 16/037*   (2006.01)
(Continued)

(52) U.S. Cl.
CPC ........ *A01B 69/008* (2013.01); *B60G 17/0195* (2013.01); *B60R 16/0236* (2013.01);
(Continued)

(58) Field of Classification Search
CPC ... A01B 63/023; A01B 69/008; A01B 79/005; B62D 6/007; B60G 17/0195;
(Continued)

(56) References Cited

U.S. PATENT DOCUMENTS 5,992,533 A    11/1999   Scarlett et al.
6,144,910 A *  11/2000   Scarlett ............... A01B 63/023
                                                                 172/4.5
(Continued)

FOREIGN PATENT DOCUMENTS

DE            42 39 530 A1    5/1994
DE    10 2014 113 466 A1    3/2016
(Continued)

OTHER PUBLICATIONS

European Search Report for European Patent Application No. EP 16 20 3913 dated Nov. 9, 2017, 8 pages.

*Primary Examiner* — Thomas G Black
*Assistant Examiner* — Ce Li Li
(74) *Attorney, Agent, or Firm* — Lempia Summerfield Katz LLC (57) ABSTRACT

An agricultural machine arrangement includes at least one traction machine and at least one attachment device adapted to the traction machine with a driver assistance system optimizing the operation of the traction machine and/or of the respective attachment device. The drive assistance system includes a computing unit and at least one display unit, wherein the computing unit processes information generated by machine-internal sensor systems, external information and information storable in the computing unit. The driver assistance system is structured so that it forms an automatic traction machine adjusting unit and/or an automatic attachment device adjusting unit, wherein the respective automatic adjusting units independently of one another or as a function of one another bring about an "optimization" of the mode of (Continued)

operation of the traction machine and/or of the at least one attachment device.

19 Claims, 4 Drawing Sheets

(51) Int. Cl.
    *B60R 16/023*     (2006.01)
    *B60G 17/0195*     (2006.01)
    *B60W 50/08*     (2012.01)
    *B62D 6/00*     (2006.01)
    *B60W 50/00*     (2006.01)

(52) U.S. Cl.
    CPC ..... *B60R 16/0373* (2013.01); *B60W 50/0098* (2013.01); *B60W 50/082* (2013.01); *B62D 6/007* (2013.01); *B60W 2050/0006* (2013.01); *B60W 2300/152* (2013.01)

(58) Field of Classification Search
    CPC ........... B60R 16/0236; B60R 16/0373; B60W 50/0098; B60W 50/082; B60W 2300/152; B60W 2050/0006
    See application file for complete search history.

(56) References Cited

U.S. PATENT DOCUMENTS

| | | |
|---|---|---|
| 2002/0082842 A1* | 6/2002 | Viaud ................... E02F 9/2004 704/275 |
| 2003/0121674 A1 | 7/2003 | Scarlett et al. |
| 2012/0004812 A1 | 1/2012 | Baumgarten et al. |
| 2014/0172247 A1 | 6/2014 | Thomson |
| 2016/0082789 A1 | 3/2016 | Wieckhorst et al. |

FOREIGN PATENT DOCUMENTS

| | | |
|---|---|---|
| EP | 0 838 141 A2 | 4/1998 |
| EP | 1 321 017 A1 | 6/2003 |
| EP | 2 401 904 A2 | 1/2012 |
| EP | 2 818 337 A1 | 12/2014 |

* cited by examiner

Fig. 4

TRACTION MACHINE AND EQUIPMENT COMBINATION WITH DRIVER ASSISTANCE SYSTEM

CROSS REFERENCE TO RELATED APPLICATIONS

This application claims priority to German Patent Application No. DE 102016118203.6, filed Sep. 27, 2016, and German Patent Application No. DE 102016108590.1, filed May 10, 2016, the entire disclosures of which are hereby incorporated herein by reference.

TECHNICAL FIELD

A traction machine and equipment combination includes a driver assistance system that is equipped to make possible optimization of the traction machine operation on its own or of the combination of traction machine and equipment.

BACKGROUND

Traction machines taken by themselves and the combination of traction machines and attachment devices, such as for example transport trailers, loading wagons, hay rakes, tedders, mowers, balers, soil tilling equipment, crop sprayers and fertilizer spreaders are highly complex and cost-intensive systems. It is therefore important that such systems are operated efficiently.

Usually, the traction machine and the attachment device adapted to it are frequently optimized today independently of one another and in different places. In addition, it is not verified if the optimized parameters found for the traction machine and for the attachment device do in fact lead to an optimization of the operation of the combination of traction machine and the respective attachment device. The optimization of the mode of operation of the traction machine and its associated attachment device that is separate from one another additionally requires a high degree of special knowledge of the traction machine driver since he has to carry out the substantial adjustments such as for example engine, transmission and running gear adjustments on the traction machine and basic adjustments on the attachment device himself, while the machines themselves or the respective available operating instructions only partly support this process.

EP 0 838 141 discloses a system with which the soil tilling device, embodied as a plough, is equipped with a job calculator which is coupled via a bus system to the operating and display unit of the traction machine embodied as a tractor. The tractor driver can now specify adjustment parameters for the plough via the operating and display unit. Even by this example, it is readily evident how extensive the special knowledge of the operator has to be since with such systems the operator is required to specify adjustment parameters both for the traction vehicle and also for the attachment device.

SUMMARY

The present disclosure provides a driver assistance system which better detects and takes into account the complex relationships during the adjustment optimization of a traction machine and an adapted attachment device so that the adjustment optimization of the traction machine and of the respective attachment device each taken on its own and combined is rendered more effective and accelerated.

In one implementation, the agricultural machine arrangement or system includes at least one traction machine and at least one attachment device adapted to the traction machine, and is equipped with a driver assistance system optimizing the operation of the traction machine and/or of the respective attachment device. The driver assistance system includes a computing unit and at least one display unit, wherein the computing unit processes information generated by machine-internal sensor systems, external information and information that can be stored in the computing unit. The traction machine and the at least one attachment device include a control device for controlling and regulating the traction machine and/or the attachment device, wherein the driver assistance system is structured so that it forms an automatic traction machine adjusting unit and/or an automatic attachment device adjusting unit and the respective automatic traction machine and attachment device adjusting units bring about, independently of one another or as a function of one another, an optimization of the mode of operation of the traction machine and/or of the at least one attachment device. In this way, it is ensured that the adjustment optimization of a traction machine and of the respective attachment device each taken on its own and combined is rendered more effective and is accelerated.

In one advantageous configuration of the invention, the driver assistance system is of such a type that the automatic traction machine adjusting unit and the automatic attachment device adjusting unit form a common automatic adjusting unit. This has the effect that the operation of highly complex machine arrangements or systems can also be optimized with one and the same driver assistance system.

Because the driver assistance system includes a set of regulations assigned to the automatic traction machine adjusting unit, and wherein the set of regulations assigned to the automatic traction machine adjusting unit brings about an optimization of the mode of operation of the traction machine independently of the mode of operation of the attachment device, the basic adjustments of a traction machine taken on its own can also be optimized with the driver assistance system.

In one advantageous further implementation, the set of regulations assigned to the automatic traction machine adjusting unit includes a set of regulations for optimizing the mode of operation of the attachment device, wherein the driver assistance system optimizes the mode of operation of the traction machine and/or of the attachment device. Such a structure has the effect that the driver assistance system can optimize an operation of an attachment device even without specific knowledge regarding the structure of a certain attachment device on the basis of generally valid relationships.

The optimization of the operation of an attachment device by means of the driver assistance system is substantially rendered more effective in particular when the set of regulations for optimizing the mode of operation of the attachment device is based on a set of regulations stored in the automatic traction machine adjusting unit, or a set of regulations provided by the respective attachment device.

A highly flexible structure of the driver assistance system materializes in particular when the set of regulations for optimizing the mode of operation of the attachment device is stored in a control device assigned to the traction machine and preferentially embodied as job calculator or a control facility assigned to the attachment device and preferentially embodied as job calculator.

In a further advantageous configuration, because the traction machine and the at least one attachment device are adapted to the former include ISO-based control devices, the driver assistance system may control the automatic adjusting units formed by the control installations as supervisor. This has the effect in particular that an optimization of the entire working process becomes possible.

A particularly efficient mode of operation of a machine arrangement or system that is optimally adapted to certain working conditions is achieved in particular when the driver assistance system for optimizing the mode of operation of the traction machine and/or of the attachment device adapted to it includes selectable strategies, wherein the selectable strategies are traction machine-specific strategies, attachment device-specific strategies and/or a combination of both.

In this connection it is additionally advantageous when the selectable strategies include at least one or a plurality of the strategies "efficiency", "performance", "working quality", "balance", "soil protection", "comfort" and/or "user-defined".

The efficiency of a machine arrangement can be increased particularly effectively when the optimization strategy "efficiency" optimizes the fuel consumption and/or the operating hours of the machine arrangement and/or the time required for so-called headland maneuvers; the optimization strategy "performance" is directed at increasing the worked area and/or worked mass of agricultural goods and/or the operating hours of the machine arrangement; the optimization strategy "working quality" brings about the optimization of adjusting parameters of the traction machine and/or of the attachment device; the optimization strategy "balance" makes possible adjusting a variable ratio between "performance" and "efficiency"; the optimization strategy "soil protection" reduces the soil pressure and/or the soil compaction caused by the machine arrangement and/or optimizes the tire inflation pressure, the ballasting and the weight of the machine arrangement, the type of the tires, the steering mode and/or the running gear slip; the optimization strategy "comfort" brings about a "user-defined" adjustment of the vibration behavior and/or acceleration behavior and/or volume of the machine arrangement; the optimization strategy "user-defined" makes possible inter-combining all available strategies with variable components.

In an advantageous further development, the driver assistance system includes a module "operating purpose" in which dialogue-guided by the operator an operating purpose is determined. For example, dialogue-guided input from the operator may be input to the "operating purpose" module to determine the operating purpose. The module "operating purpose" can include one or more of the operating purposes, such as "soil tilling", "power take-off shaft operation", "transport work" and "front loader work". In one implementation, this has the effect, above all, that the optimization of parameters remains restricted to those parameters which are significant to the respective "operating purpose" and which can already be determined in advance for a parameter that is standardized for a certain "operating purpose". Altogether, this results in that the optimization process is accelerated.

The reproducibility and the individualization of the process parameters optimized with the driver assistance system can be significantly improved because of this when in an advantageous configuration, the parameters defined by the operator in the module "operating purpose" and the working parameters generated following the execution of an optimization strategy are stored as separate or joint data sets and the data set or the data sets can be repeatedly accessed and edited, wherein the data set or the data sets can be in particular stored and re-accessed in a personalized manner.

In addition, the operation of a machine arrangement can also be further optimized in that the storable data set or data sets comprise specific data sets for working on field and road trip and the specific data sets for working on field and road trip are directly accessible.

In addition to the speed of the optimization process, the acceptance of a driver assistance system-based operation optimization can also be increased in that the dialogue between the driver assistance system and operator takes place by way of natural speech.

In an advantageous further development, the dialogue between driver assistance system and operator includes at least the steps:

a) activating the driver assistance system by the operator or automatically upon identification of a critical situation b) activating a module "operating purpose", wherein the operator brings about the editing of the "operating purpose"

c) activating a module "field/road", wherein the operator presets the operation field or road or the driver assistance system automatically recognizes the operation d) starting the module "optimization", wherein the operator is prompted to select an optimization strategy e) as a function of the selected optimization strategy activation of a dialogue-prompted optimization of working parameters of the traction machine and/or of the attachment device adapted to the traction machine.

This enables that the optimization of the working process is carried out systematically.

A comprehensive "optimization" of the operation of the traction machine is achieved in an advantageous configuration in particular when the editable working parameters of the traction machine is/are one or a plurality of the following parameters: engine lugging; acceleration; the selection of the suitable driving range provided the drive of the traction machine permits operating in driving ranges; the travelling speed and the presetting of speed values for a cruise control that is known per se; activation and deactivation of an all-wheel drive; activation and deactivation of a differential known per se; the tire status determination, a proposal for suitable tires including; definition of suitable ballasting weights for front and/or rear attachment; definition wheel weights; the driver's cab suspension; the front axle spring suspension; the behavior and the type of connecting the attachment device to the traction machine; adapting hydraulic settings, valves to be used, required oil quantity and oil delivery times; an optimized tire inflation pressure; the power take-off shaft rotational speed; the type and embodiment of the power take-off shaft; the steering mode to be selected for example the crab steering gear known per se, standard steering, reversing, steering by GPS-data and/or driving programs.

Analogously, a comprehensive optimization of the operation of an attachment device materializes in an advantageous configuration in particular when the attachment device is embodied as soil tilling device and the editable working parameters of the attachment device are one or more of the following parameters: working depth of the tools; working width of the attachment device; the preload of traction cylinders; the number and type of the installed tools; the working speed of the attachment device; the adjustment of the existing tools; the type of hitching the attachment device to the traction machine; type and status of a stone guard known per se; type and status of a transport device; type and status of a support and/or guiding unit.

BRIEF DESCRIPTION OF THE DRAWINGS

Exemplary embodiments are shown in a plurality of figures as follows.

DETAILED DESCRIPTION

Figure 1:
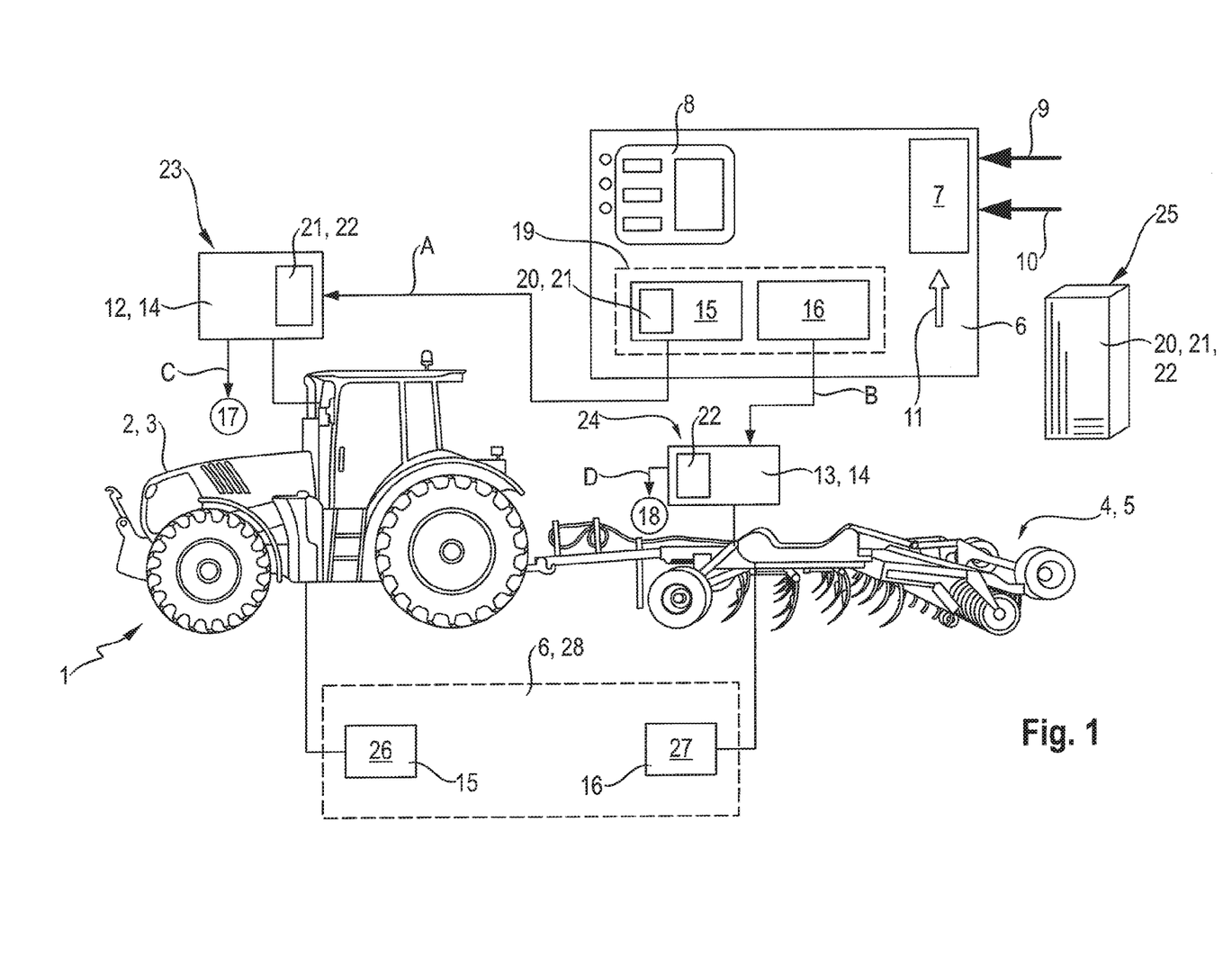
FIG. 1 is a schematic representation of the machine arrangement

The agricultural machine arrangement 1 shown in FIG. 1 includes a traction machine 3 embodied as a tractor 2 and at least one attachment device 5 coupled or adapted to the traction machine 3, as soil tilling device 4—here embodied as a so-called harrow. The attachment device 5 may be embodied as any attachment device, including for example a transport trailer, loading wagon, hay rake, tedder, mower, baler, other soil tilling devices such as for example as plough, crop sprayer or fertilizer spreader. In a manner still to be described in more detail, the machine arrangement 1 is assigned the driver assistance system 6 that optimizes the operation of the traction machine 3 and/or of the respective attachment device 5. The driver assistance system 6 includes at least one computing unit 7 and one display unit 8, wherein the computing unit 7 processes information 9 generated by machine-internal sensor systems, external information 10 and information 11 that can be stored in the computing unit 7. The computing unit 7 may be hardware or a combination of hardware and software. In one implementation, the computing unit 7 may comprise a single computing unit. In an alternate implementation, the computing unit 7 may be segmented into multiple sub-computing units, which may be configured to execute specific functions, as discussed in further detail below. As one example, the computing unit (or a subpart thereof) may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, the computing unit 7 (or a subpart thereof) may include memory hardware that comprises instructions executable with a processor or processor circuitry to implement one or more of the features of the module. The display unit 8 is one example of an input and/or output unit. In particular, the display unit 8 may be configured to output information. Alternatively, or in addition, the display unit 8 may be configured to input operator selectable strategies, such as optimization strategies, as discussed further below.

In addition, the traction machine 3 and the attachment device 5 are assigned one or a plurality of control devices 12, 13 for controlling and regulating the traction machine 3 and/or the respective attachment device 5. The traction machine 3 and the attachment device 5 are assigned either separate control installations 12, 13 for activating the wide range of working elements or a common control unit 14. The common control unit 14 can then be positioned either on the traction machine 3 or the attachment device 5. The display unit 8 may also be configured to be mobile so that it can be carried along by the operator of the machine arrangement 1.

In one implementation, the driver assistance system 6 is structured so that it forms an automatic traction machine adjusting unit 15 and an automatic attachment device adjusting unit 16, wherein the respective automatic adjusting units 15, 16, independently of one another or as a function of one another, bring about an "optimization" of the mode of operation of the traction machine 3 and of the at least one attachment device 5. Similar to the computing unit 7, the respective automatic adjusting units 15, 16 may each be hardware or a combination of hardware and software. In one implementation, the respective automatic adjusting units 15, 16 may each comprise a single computing unit configured to perform respective functionality. In an alternate implementation, the respective automatic adjusting units 15, 16 may comprise separate computing processes within a common computing device, such as automatic adjusting unit 19, discussed below.

In the simplest of cases, this is brought about in that the respective automatic adjusting unit 15, 16 generates control signals A, B which are fed to the respective control unit 12, 13, 14 where they bring about in each case the activation of certain working elements 17, 18 of the traction machine 3 and of the attachment device 5 by generating corresponding control signals C, D.

The driver assistance system 6 can be additionally designed so that the automatic traction machine adjusting unit 15 and the automatic attachment device adjusting unit 16 form a common automatic adjusting unit 19. In one implementation, the common automatic adjusting unit 19 may execute separate processes of programmed instructions that are configured to perform respective functions of the automatic traction machine adjusting unit 15 and the automatic attachment device adjusting unit 16, and that are independently managed by the common automatic adjusting unit 19. In a first specific implementation, the separate processes configured to perform respective functions of the automatic traction machine adjusting unit 15 and the automatic attachment device adjusting unit 16 may be executed on separate hardware units (e.g., on separate processor). In a second specific implementation, the separate processes configured to perform respective functions of the automatic traction machine adjusting unit 15 and the automatic attachment device adjusting unit 16 may be executed on a single hardware unit (e.g., on a single processor).

In addition, the driver assistance system 6 can include a set of regulations 20, which is assigned to the automatic traction machine adjusting unit 15 and which brings about "optimization" of the mode of operation of the traction machine 3 independently of the mode of operation of the attachment device 5. In a simple configuration version, the set of regulations 20 assigned to the automatic traction machine adjusting unit 15 can include a set of regulations 21 for optimizing the mode of operation of the attachment device 5 so that the driver assistance system 6 optimizes the mode of operation of the traction machine 3 and of the attachment device 5. The set of regulations 21 for optimizing the mode of operation of the attachment device 5 can, in addition to the direct storage in the automatic traction machine adjusting unit 15, also be provided as an external set of regulations 22 by the respective attachment device 5. Furthermore the set of regulations 21, 22 for optimizing the mode of operation of the attachment device 5 may be stored in a control device 12 that is assigned to the traction machine 3 and is preferentially embodied as job calculator 23, or in a control device 13 that is assigned to the attachment device 5 and is preferentially likewise embodied as job calculator 24. Alternatively, or in addition, the set of regulations 20-22 may also be centrally stored on a server 25.

In one implementation, the traction machine 3 and the at least one adapted attachment device 5 are assigned ISO-based control devices 26, 27, which are embodied as job calculators. The driver assistance system 6 may control the automatic adjusting units 15, 16 formed by the control installations 26, 27 as supervisor 28 so that an "optimization" of the entire working process results.

Because the driver assistance system 6 is designed so that it includes an automatic traction machine adjusting unit 15 and/or an attachment device automatic 16, which act either independently of one another or are combined in a joint automatic adjusting unit 19 which operates as supervisor 28, a highly flexible assistance system for optimizing an agricultural machine arrangement 1 is created. A driver assistance system 6 structured in this manner creates the possibility to assign an automatic traction machine adjusting unit 15 to the traction machine 3, which independently of an attachment device 5 to be adapted exclusively optimizes the operation of the traction machine 3. Because the automatic traction machine adjusting unit 15, in addition to the set of regulations 20, includes the "optimization" of the traction machine 3 also comprises a set of regulations 21 for optimizing the operation of the attachment device 5, the driver assistance system 6 is capable of optimizing both the operation of the traction machine 3 and also of the attachment device 5. The set of regulations 21 bringing about the "optimization" of the attachment device 5 can be structured in this case so that it includes a basic regulator works that is always stored in the driver assistance system 6 independently of the attachment device 5. In an expansion stage, the set of regulations 22 for optimizing the operation of the respective attachment device 5 may be transferred to the driver assistance system 6 by the attachment device 5 itself. This has the advantage that the set of regulations 22 can define far more specifically the requirements, the optimal working conditions, of the specific attachment device 5. In this regard, one or more aspects for optimizing operation of the attachment device may first be resident in the attachment device 5 (e.g., in the set of regulations 22) and may thereafter transferred by the attachment device 5 to the driver assistance system 6 in order for the driver assistance system 6 to optimize operation of the respective attachment device 5. When both the attachment device 5 and also the traction machine 3 comprise control devices 12, 13 embodied as job calculators 23, 24, the control installations 12, 13 can be embodied as so-called ISO-based control installations 26, 27, which in each case includes the traction machine-based and the attachment device-based set of regulations 20, 22 so that the driver assistance system 6 controls the automatic adjusting units 15, 16 as supervisor 28. This has the effect, in particular, that the operation of the entire machine arrangement becomes optimizable taking into account a large number of complex relationships between traction machine 3 and one or more adapted attachment devices.

Figure 2:
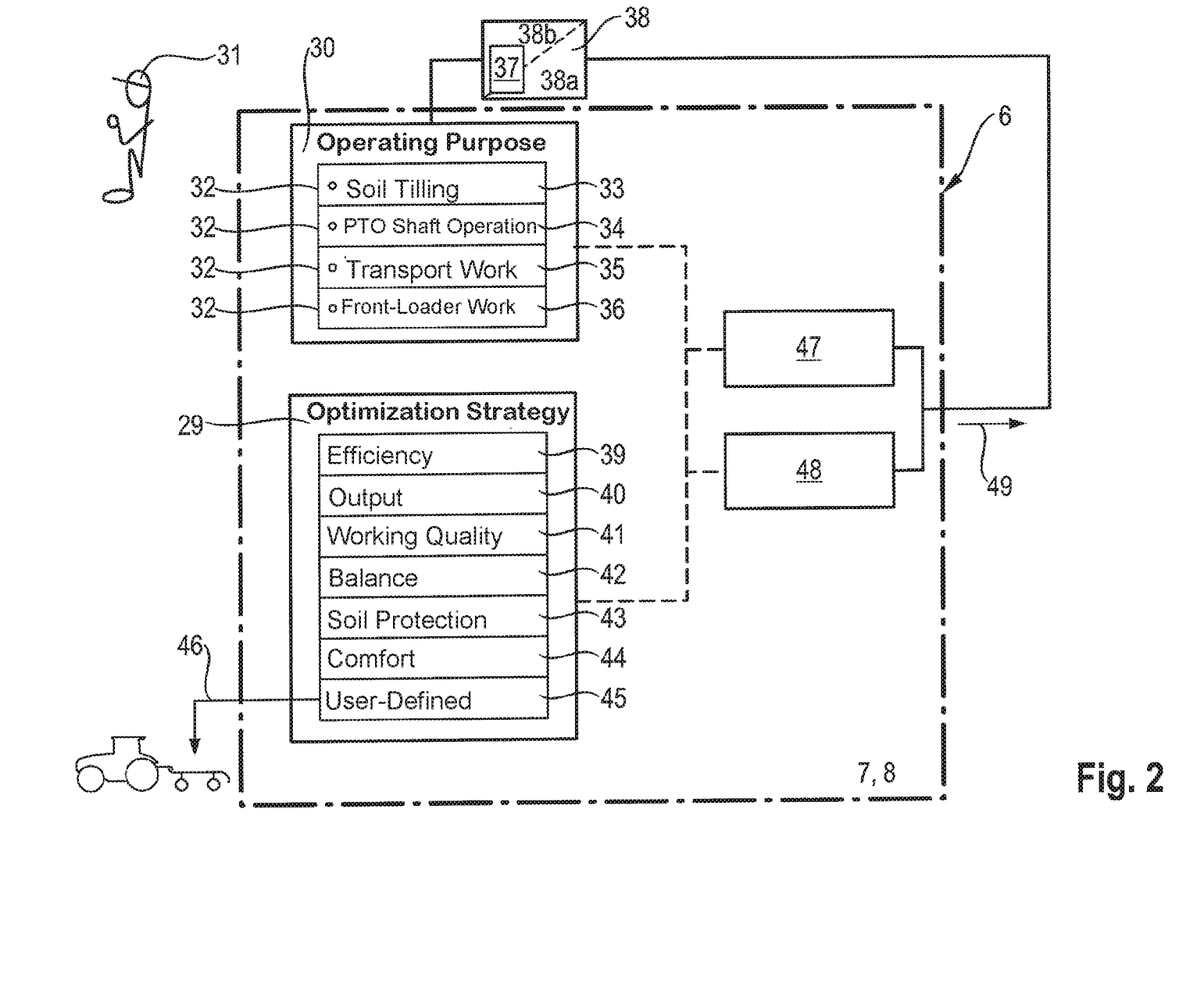
FIG. 2 is a detail view of the driver assistance system

FIG. 2 shows a schematic representation of the driver assistance system 6, wherein the visualization, operating and structural aspects are combined. The driver assistance system 6 includes an "operating purpose" 30 module in which dialogue provided by the operator 31 determines an operating purpose 32, wherein the operator 31 can determine the operating purpose in advance, for example in the yard. In the shown exemplary embodiment, the "operating purpose" module 30 comprises one or a plurality of operating purposes "soil tilling" 33, "power take-off shaft operation" 34, "transport work" 35 and "front loader work" 36. The working parameters 37 that are defined by the operator 31 in the "operating purpose" module 30 and still to be described in more detail are stored as data set 38. The data set 38 in this case can include a basic data set 38a and a customer-specific data set 38b, wherein the basic data set includes all those data which need not mandatorily be edited specifically by the operator and have been stored by the operator for the task selected in the "operating purpose" module 30 in a generally valid and thus predefined manner. The data set 38 generated in the "operating purpose" module 30 is repeatedly accessibly and editably stored. The data set 38 can be stored either centrally on a server 25, or decentrally on the traction machine 3 and/or the attachment device 5 and/or a flexible storage medium such as for example a memory card or a USB stick. The storable data set or data sets 38 are either personalized or freely accessible and thus interchangeably stored between various operators 31 of a wide range of machine arrangements 1.

For optimizing the mode of operation of the traction machine 3 and/or of the attachment device 5 adapted to it, the driver assistance system 6 additionally includes selectable optimization strategies 29 explained below in more detail, wherein the selectable optimization strategies 29 are traction machine-specific strategies, attachment device-specific strategies and/or a combination of both.

An efficient "optimization" of the machine arrangement 1 consisting of the traction machine 3 and adapted attachment device 5 is obtained in particular when the selectable optimization strategies 29 include at least one or more of the strategies "efficiency" 39, "output" 40 (e.g., performance output), "working quality" 41, "balance" 42, "soil protection" 43, "comfort" 44 and "user-defined" 45.

The optimization strategy "efficiency" 39 in this case can optimize machine fuel consumption and machine operating hours and/or comprise the optimization of the time required for so-called headland maneuvers.

The optimization strategy "output" 40, in an advantageous configuration, is directed at least at increasing the worked area and/or processed mass of agricultural goods and/or of the machine operating hours.

Within the optimization strategy "working quality" 41, at least the optimization of adjusting parameters 46 of the traction machine 3 and/or of the attachment device 5, which are described in more detail below, is carried out in order to achieve a desired working result that is dependent on the type of the attachment device 5.

The optimization strategy "balance" 42 is designed so that a variable ratio between "output" 40 and "efficiency" 39 is adjustable.

The optimization strategy "soil protection" 43 is directed at the effects of the work of the machine arrangement 1 on the soil and optimizes adjusting parameters 46 of the traction machine 3 and of the attachment device 5 so that a soil-protecting mode of operation results. This optimization strategy is particularly effective when for example a minimization of the soil pressure and the soil compaction reduction connected with this, a minimization of the tire inflation pressure, a balanced ballasting and thus a weight minimization as well as optimized tires, steering modes and a minimization of the running gear slip are taken into account or achieved.

The optimization strategy "comfort" 44 in the simplest case is designed so that a user-defined vibration behavior and/or acceleration behavior and/or the volume of the machine arrangement 1 is adjustable.

The optimization strategy "user-defined" 45 allows the operator 31 to combine all available optimization strategies 29 with variable proportions so that interactions and dependencies between the optimization strategies 29 can be better taken into account.

The driver assistance system 6 is additionally designed so that it can either be operated in a dialogue mode 47 with the operator 31 or in an automatic mode 48. In both cases, the communication, such as the dialogue, with the operator 31 takes place in natural speech.

The optimized operating parameters 46 generated following the execution of the dialogue mode 47 or of the automatic mode 48 are reaccessibly and editably stored in a data set 49 analogously to the data set 38. In the simplest case, the data set 49 is part of the already described data set 38. Analogously to data set 38, data set 49 can also be stored and re-accessed in a personalized manner.

Figure 3:
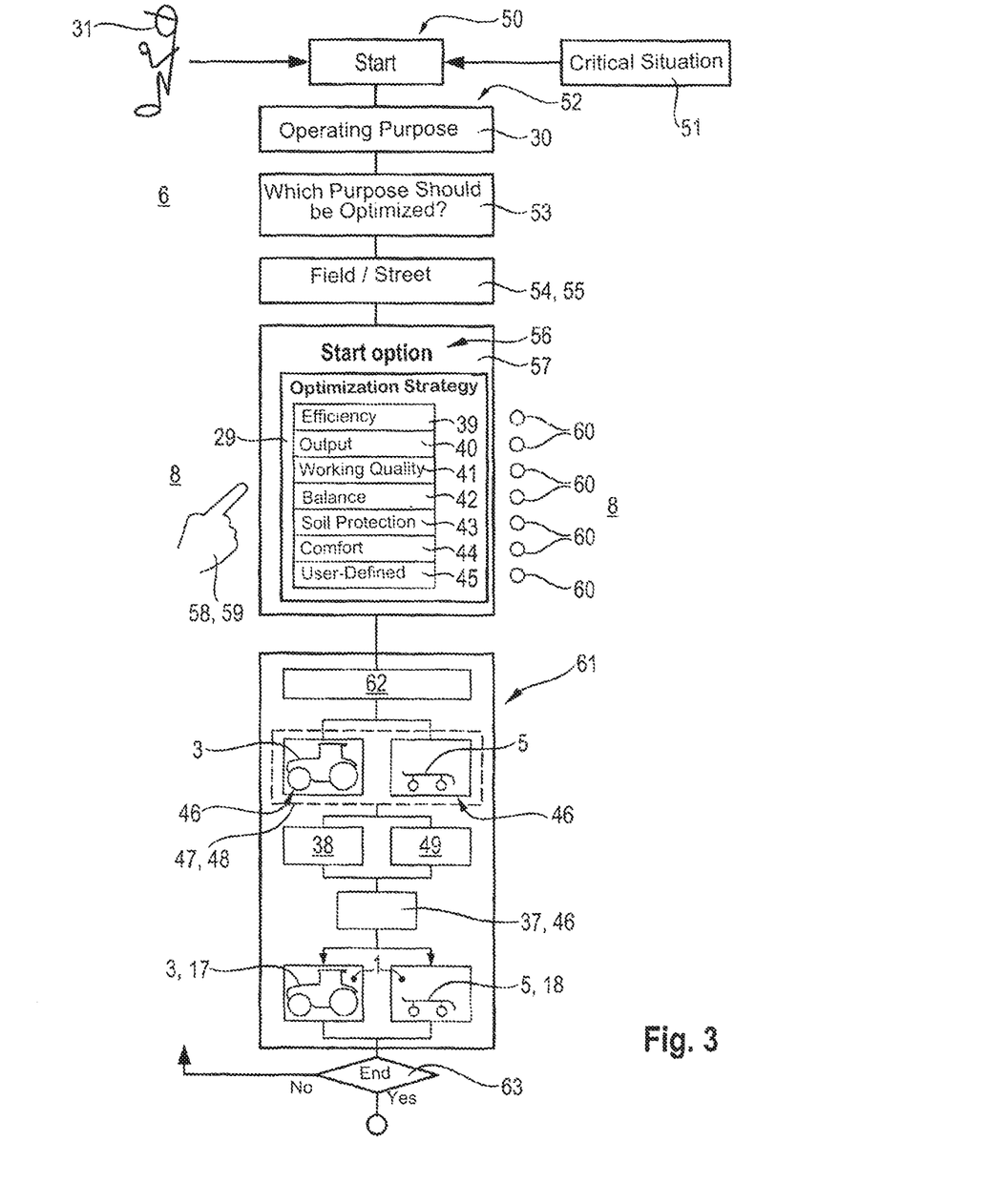
FIG. 3 is a diagram of the method according to which the driver assistance system operates

FIG. 3 describes the mode of operation of the driver assistance system 6, in particular the dialogue between operator 31 and driver assistance system 6 in more detail. In a first method step 50, the activation of the driver assistance system 6 takes place by the operator 31 or automatically upon identification of a critical situation 51.

In the following step 52, the "operating purpose" module 30 is activated, wherein the operator 31 brings about the editing of the "operating purpose" 32. In the simplest case, at 53, the driver assistance system 6 will ask the operator 31 for which of the operating purposes 32, explained in FIG. 2, optimization is to be initiated.

In the following method step 54, a module "field/road" 55 is activated, wherein the operator 31 presets the operation field or road, or the driver assistance system 6 automatically detects the operation. In the simplest case, the automatic detection can be brought about in that the machine arrangement is assigned a GPS transmitter by means of which the position of the machine arrangement 1 can be determined. It is also contemplated that the position on a road or field is determined by way of a threshold value for the travelling speed of the machine arrangement, for example 25 km/h, wherein travelling speeds which are above the threshold value are identified as road travel.

In the following step 56, a module "optimization" 57 is started, wherein the operator 31 is prompted to select the optimization strategy 29, 30-45. The selection of the respective optimization strategy 39-45 in this case can be effected depending on the design of the display unit 8 in each case by way of manual activation 58 on a touch screen monitor 59 or by activating activation keys 60 assigned by the respective optimization strategy 39-45.

As a function of the selected optimization strategy 39-45, a dialogue-guided optimization 62, still to be explained in more detail, of working parameters 46 of the traction machine 3 and/or of the attachment device 5 adapted to the traction machine 3 is activated in a further method step 61. At the same time, the operation of a plurality of attachment devices 5 which are adapted to the traction machine 3 for example at the front and rear as well as laterally is optimized. As already described, the "optimization" of the mode of operation of the traction machine and of the adapted attachment device or attachment devices 5 can take place in a dialogue mode 47 or in an automatic mode 48. In both cases, as likewise already described, data sets 38, 49 are generated which include optimized working parameters 37, 46 of the working elements 17, 18 of the traction machine 3 and/or of the attachment device or attachment devices 5. The driver assistance system 6 can be designed so that the determined optimized operating parameters 37, 46 are either directly adjusted on the respective working element 17, 18, the operator 31 is asked if the determined operating parameters 37, 46 are to be adjusted or the operating parameters 37, 46 are merely to be displayed and the operator 31 subsequently has to initiate these being adjusted.

The storable data set or data sets (38, 49) can additionally comprise specific data sets for working on field and road travel, wherein the specific data sets (38, 49) for working on field and road travel are directly accessible.

Following the completed "optimization" of the operation of the machine arrangement 1, the operator 31 is asked in a decision-making step 63 if the "optimization" is to be terminated or not. Depending on the decision of the operator 31, the "optimization" is then terminated or the driver assistance system 6 starts anew with method step 50.

Figure 4:
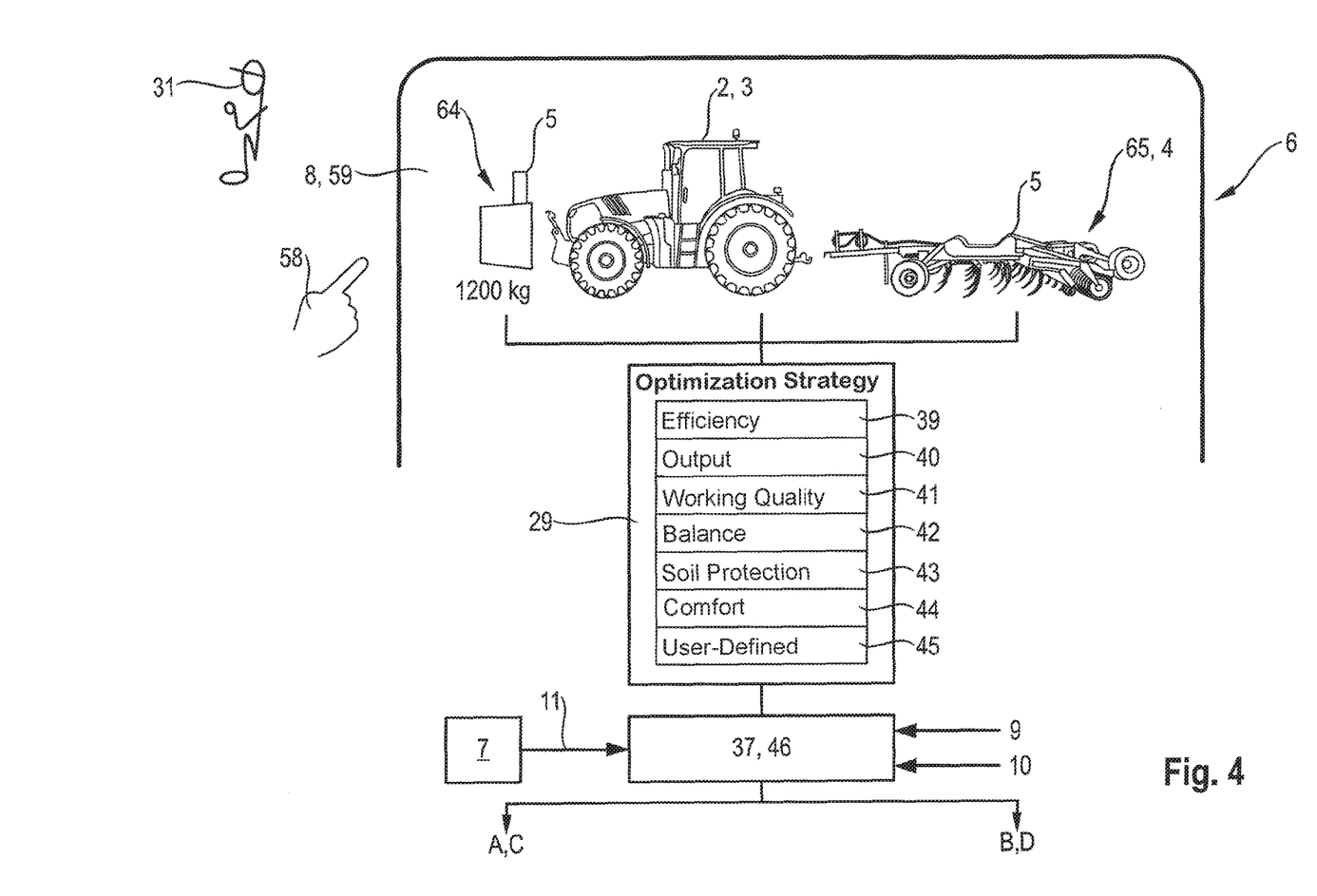
FIG. 4 is a detail view of the driver assistance system according to the FIGS. 2 and 3.

FIG. 4 schematically shows how, by means of the driver assistance system 6, an optimization of the wide range of operating parameters 37, 46 of the traction machine 3 and of the attachment device or attachment devices 5 is achieved. For the sake of simplicity, a display unit 8 embodied as touch screen monitor 59 is assumed in the following. In one implementation, all manual activations 58 can also be performed by means of keys, which are not shown.

Initially, the operator 31 can determine through manual activation 58 if the mode of operation of the traction machine 3 embodied as tractor 2 and/or of the attachment devices 5 is to be optimized. In the shown exemplary embodiment, two types of attachment devices are exemplarily shown, namely a front weight 64 and a soil tilling device 4 embodied as grubber 65. As discussed above, other types of attachment devices are contemplated.

Because of the fact that the respective icon for tractor 2 and/or attachment device 5 is activated, the dialogue field selection optimization strategy 29 opens and the operator 31 selects the desired optimization strategy 39-45. As a function of the selected optimization strategy 39-45, the driver assistance system 6 taking into account the available information 9 generated by machine-internal sensor systems and/or the available external information 10 and/or the information 11 stored in the computing unit 7 determines optimized operating parameters 37, 46 for the traction machine 3 and the attachment device or attachment devices 5. As previously described, the optimized operating parameters 37, 46 are then adjusted by way of corresponding control signals A—D to be transmitted to the tractor 2 or the attachment device 5.

Since the front weight 64 forms an original part of the traction machine 2 embodied as tractor 2, the "optimization" of the operation of the traction machine 2 can simultaneously include the "optimization" of the ballasting 64. In this case, an efficient "optimization" of the operating parameters 46 is achieved by means of the driver assistance system 6 in particular when the editable and optimizable operating parameters 46 comprise one or more of the following operating parameters 46:
engine lugging; the acceleration; the selection of the suitable driving range provided the drive of the traction machine permits operating in driving ranges; the travelling speed and the presetting of speed values for a cruise control that is known per se; activation and deactivation of an all-wheel drive; activation and deactivation of a differential known per se; the tire status determination, a proposal for suitable tires comprising; definition of suitable ballasting weights 64 for front and/or rear attachment; the cab spring suspension; the front axle spring suspension; the behavior and the type of connecting the attachment device 5 to the traction machine 3; adapting of hydraulic adjustments, valves to be used, required oil quantity and oil delivery times; an optimized tire inflation pressure; the power take-off shaft rotational speed; the type and embodiment of the power take-off shaft; the steering mode to be selected for example the crab steering mode known per se, standard steering, reversing, steering by GPS data and/or driving programs.

Thus, in one implementation, the driver assistance system 6 may optimize any one, any combination, or all of the working parameters 46.

A comprehensive "optimization" of the mode of operation of the machine arrangement 1 is additionally obtained in particular when the attachment device 5 is embodied as soil tilling device 4 and in this case specifically as grubber 65 and the editable working parameters 46 of the attachment device 5 are one or a plurality of the following parameters: working depth of the tools; working width of the attachment device 5; the preload of the traction cylinders assigned to the three-point attachment known per se; the number and type of installed tools; the working speed of the attachment device; the adjustment of the existing tools; the type of hitching of the attachment device to the traction machine; type and status of a so-called stone guard; type and status of a transport installation; type and status of a support and/or guiding unit.

REFERENCE LIST

1 Machine arrangement
2 Tractor
3 Traction machine
4 Soil tilling device
5 Attachment device
6 Driver assistance system
7 Computing unit
8 Display unit
9 Internal information
10 External information
11 Storable information
12 Control device
13 Control device
14 Control unit
15 Automatic traction machine adjusting unit
16 Automatic attachment device adjusting unit
17 Working element
18 Working element
19 Automatic adjusting unit
20 Set of regulations for the tractor
21 Set of regulations for the attachment device internal
22 Set of regulations for the attachment device external
23 Job calculator
24 Job calculator
25 Server
26 ISO-based control installation
27 ISO-based control installation
28 Supervisor
29 Optimization Strategy
30 "Operating purpose" module
31 Operator
32 Operating purpose
33 Soil tilling
34 Power take-off shaft operation
35 Transport work
36 Front loader work
37 Operating parameters
38 Data set
38a Basic data set
38b Custom-specific data set
39 Efficiency
40 Output
41 Working quality
42 Balance
43 Soil protection
44 Comfort
45 User-defined
46 Operating parameters
47 Dialogue mode
48 Automatic mode
49 Data set
50 Method step
51 Critical situation
52 Method step
53 Question
54 Method step
55 Module "field/road"
56 Method step
57 Module "optimization"
58 Manual activation
59 Touch screen monitor
60 Activation key
61 Method step
62 Dialogue-guided optimization
63 Decision-making step
64 Front weight
65 Grubber
A Control signal
B Control signal
C Control signal
D Control signal

What is claimed is:

1. An agricultural machine system comprising:
at least one traction machine comprising a traction machine control unit comprising traction machine control unit regulations configured to control an aspect of the agricultural machine system;
at least one attachment device coupled to the traction machine and comprising an attachment device control unit comprising attachment device control unit regulations configured to control another aspect of the agricultural machine system; and
a driver assistance system operably coupled to the traction machine and the attachment device, the driver assistance system comprising a computing unit and at least one input unit, the computing unit configured to process information generated by machine-internal sensor systems, external information and information stored in the computing unit, the computing unit comprising an automatic traction machine adjusting unit and an automatic attachment device adjusting unit;
wherein the automatic traction machine adjusting unit comprises automatic traction machine adjusting unit regulations and is configured to generate, based on the automatic traction machine adjusting unit regulations, one or more control signals as input to the traction machine control unit for the traction machine in order to control at least one aspect of the traction machine;
wherein the automatic attachment device adjusting unit is configured to generate one or more control signals as input to the attachment device control unit for the attachment device in order to control at least one aspect of the attachment device; and
wherein the automatic traction machine adjusting unit and the automatic attachment device adjusting unit are configured to operate independently of one another in order to optimize a mode of operation of the traction machine and the attachment device.

2. The agricultural machine system of claim 1,
wherein the automatic traction machine adjusting unit regulations assigned to the automatic traction machine adjusting unit brings about an optimization of the mode of operation of the traction machine independently of the mode of operation of the attachment device.

3. The agricultural machine system of claim 2, wherein the automatic traction machine adjusting unit regulations assigned to the automatic traction machine adjusting unit comprises a set of regulations for optimizing the mode of operation of the attachment device; and wherein the driver assistance system is configured to optimize the mode of operation of both the traction machine and the attachment device.

4. The agricultural machine system of claim 3, wherein the set of regulations for optimizing the mode of operation of the attachment device is based on a set of regulations provided by the attachment device.

5. The agricultural machine system of claim 4, wherein the traction machine control unit regulations comprise the set regulations for optimizing the mode of operation of the attachment device.

6. The agricultural machine system of claim 1, wherein the driver assistance system is configured to optimize the mode of operation of the traction machine and of the attachment device by implementing selectable optimization strategies;

wherein the selectable optimization strategies comprise at least one or both of traction machine-specific strategies and attachment device-specific strategies; and wherein one or both of the automatic traction machine adjusting unit and the automatic attachment device adjusting unit are configured to use the selectable optimization strategies to optimize the mode of operation of the traction machine and the attachment device.

7. The agricultural machine system of claim 6, wherein the selectable optimization strategies comprise at least one or a plurality of: efficiency; performance; working quality; balance; soil protection; comfort; or user-defined.

8. The agricultural machine system of claim 1, wherein the driver assistance system comprises an operating purpose module configured to determine an operating purpose in response to dialogue guided by an operator;

wherein the operating purpose module comprises one or more of the operating purposes of: soil tilling; power take-off shaft operation; transport work; or front loader work; and wherein optimization of the traction machine or the attachment device is based on the operating purpose.

9. The agricultural machine system of claim 8, wherein parameters defined in the operating purpose module and operating parameters, used to control operation of the traction machine or the attachment device and generated after execution of an optimization strategy in the driver assistance system, are stored as one or more data sets; and wherein the one or more data sets are repeatedly accessible and editable.

10. The agricultural machine system of claim 9, wherein the one or more data sets comprise specific data sets for working on field and road trips; and wherein the specific data sets for working on field and road trips are directly accessible.

11. The agricultural machine system of claim 9, wherein the data sets comprise editable operating parameters of the traction machine.

12. The agricultural machine system of claim 11, wherein the operating parameters comprise one or a plurality of: engine lugging; acceleration; choice of suitable driving range; travelling speed and presetting of speed values for a cruise control; activation and deactivation of an all-wheel drive; activation and deactivation of a differential known per se; a proposal for suitable tires; suitable ballasting weights for front or rear attachment; cab spring suspension; front axle spring suspension; behavior and type of connection of the attachment device to the traction machine; adapting hydraulic adjustments, valves to be used, required oil quantity and oil delivery times; an optimized tire inflation pressure; power take-off shaft rotational speed; type and embodiment of the power take-off shaft; steering mode; or driving programs.

13. The agricultural machine system of claim 11, wherein the attachment device comprises a soil tilling device and the editable operating parameters of the attachment device are one or a plurality of the following: working depth of tools; working width of the attachment device; preload of traction cylinders; number and type of installed tools; working speed of the attachment device; adjustment of existing tools; type of hitching of the attachment device to the traction machine; type and status of a stone guard; type and status of a transport device; type and status of a support; or guiding unit.

14. The agricultural machine system of claim 1, wherein the traction machine control unit regulations comprise a set of regulations for the attachment device.

15. The agricultural machine system of claim 14, wherein the attachment device comprises a particular attachment device; and wherein the traction machine control unit regulations comprise a first set of regulations for the attachment device and a second set of regulations for the attachment device, the second set of regulations being more specifically defined to the particular attachment device than the first set of regulations.

16. The agricultural machine system of claim 15, wherein the second set of regulations for the attachment device are resident in the attachment device.

17. The agricultural machine system of claim 14, wherein the automatic traction machine adjusting unit regulations, in the automatic traction machine adjusting unit, includes the set of regulations for the attachment device.

18. The agricultural machine system of claim 1, wherein the automatic traction machine adjusting unit and the automatic attachment device adjusting unit are executed on separate processors.

19. A method of operating an agricultural machine system comprising:

activating a driver assistance system by an operator or by automatic identification of a critical situation, wherein the driver assistance system is operably coupled to a traction machine and an attachment device, the driver assistance system comprising a computing unit and at least one input unit, the computing unit configured to process information generated by machine-internal sensor systems, external information and information stored in the computing unit, the computing unit comprising an automatic traction machine adjusting unit and an automatic attachment device adjusting unit, wherein the automatic traction machine adjusting unit comprises automatic traction machine adjusting unit regulations and is configured to generate one or more control signals as input to a traction machine control unit for the traction machine in order to control at least one aspect of the traction machine, wherein the automatic attachment device adjusting unit is configured to generate one or more control signals as input to an attachment device control unit for the attachment device in order to control at least one aspect of the attachment device, and wherein the automatic traction machine adjusting unit and the automatic attachment device adjusting unit are configured to operate independently of one another in order to optimize a mode of operation of the traction machine and the attachment device, wherein the traction machine control unit comprises traction machine control unit regulations configured to control an aspect of the agricultural machine system, wherein the attachment device control unit comprises attachment device control unit regulations configured to control another aspect of the agricultural machine system;

activating an operating purpose module, wherein the operating purpose module is configured to receive input from the operator to edit an operating purpose;

activating a field/road module, wherein the field/road module is configured to receive input from the operator that specifies an operation field or road, or configured to automatically detect an operation;

starting an optimization module, wherein the optimization module is configured to receive an optimization strategy from the operator;

as a function of the optimization strategy, activating a dialogue-guided optimization of operating parameters of the traction machine or of the attachment device adapted to the traction machine;

using the automatic traction machine adjusting unit and the automatic attachment device adjusting unit in order to optimize, based on the optimization strategy, the mode of operation of the traction machine and the attachment device;

using the traction machine control unit regulations in order to control an aspect of the agricultural machine system; and using the attachment device control unit regulations in order to control another aspect of the agricultural machine system.

* * * * *

UNITED STATES PATENT AND TRADEMARK OFFICE
CERTIFICATE OF CORRECTION

PATENT NO. : 10,085,372 B2
APPLICATION NO. : 15/590550
DATED : October 2, 2018
INVENTOR(S) : Pierre Noyer et al.

Page 1 of 1

It is certified that error appears in the above-identified patent and that said Letters Patent is hereby corrected as shown below:

On the Title Page

In the Assignee information:
"CLAAS Selbstfahrende Ernemaschinen GmbH"

Should be replaced with:
"CLAAS Selbstfahrende Erntemaschinen GmbH"

Signed and Sealed this
Fourth Day of December, 2018

Andrei Iancu
*Director of the United States Patent and Trademark Office*